March 21, 1961

A. STAMBERA 2,976,006

APPARATUS FOR FEEDING ROD-SHAPED
ARTICLES TO AUTOMATIC SCALES

Filed March 25, 1958

INVENTOR:
ADOLF STAMBERA

By Richardson, David and Nordon

ATTYS.

March 21, 1961  A. STAMBERA  2,976,006
APPARATUS FOR FEEDING ROD-SHAPED
ARTICLES TO AUTOMATIC SCALES Filed March 25, 1958  3 Sheets-Sheet 2

INVENTOR:
ADOLF STAMBERA

INVENTOR:
ADOLF STAMBERA
By
Richardson, David and Wardon
ATT'YS

United States Patent Office 2,976,006
Patented Mar. 21, 1961

2,976,006

APPARATUS FOR FEEDING ROD-SHAPED ARTICLES TO AUTOMATIC SCALES

Adolf Stambera, Stuttgart-Bad Cannstatt, Germany, assignor to Firma Fr. Hesser, Maschinenfabrik-Aktiengesellschaft, Stuttgart-Bad Cannstatt, Germany, a corporation of Germany Filed Mar. 25, 1958, Ser. No. 723,674

Claims priority, application Germany Apr. 5, 1957

11 Claims. (Cl. 249—15)

The present invention relates to apparatus for feeding elongated rod-shaped articles having a length substantially greater than their thickness, for example macaroni, spaghetti and the like, to automatic scales, preferably of the type used in combination with automatic packaging machines.

In the automatic weighing of articles of the kind mentioned above, the usual vibrating chutes or conveyor belts are not suitable for feeding the rod-shaped articles to be weighed in a uniform and uninterrupted manner to the basin or hopper of the automatic scale, as it is necessary for exact weighing. This is especially due to the fact that these articles during the feed motion, and frequently already in the outlet of the feeding hopper, tend to assume an oblique position thereby causing interruptions or delay in the continuous supply of the articles.

In view of these difficulties, vibrating chutes of the aforementioned type have already been provided with strippers fixedly mounted thereon or swinging tangentially thereto for the purpose of spreading out and aligning the macaroni or the like in such a manner that they are finally arranged on the part of the chute opening into the scale hopper, in a single layer and parallel to each other. But also this feeding arrangement is not satisfactory since with the one-layer feed the efficiency of the weighing machine is very limited. Moreover, this type of feeding arrangement is subject to frequent disturbances and failures, particularly when part of the macaroni or spaghetti to be weighed are bent or not cut off cleanly at their ends.

According to the present invention these drawbacks are obviated by providing the shaft-like outlet of the feed hopper of the apparatus with a portioning device for the articles contained in said outlet shaft, said portioning device comprising a shut-off gate and a pivotable separating wedge which is arranged above said gate and is adjustable with regard to its distance to the latter, and by providing downstream of said portioning device deflecting means preferably in the form of a deflecting flap which is automatically controlled in such a manner that one part of the batches of goods or articles divided off by said portioning device is conducted directly to the scale hopper as preliminary filling of bulk feed, whilst the other part of said batches is conducted to said scale hopper between said bulk feeds as a fine feed, i.e. for exactly making up the nominal weight, via a plurality of electromagnetically controlled vibrating chutes, preferably two, arranged at an acute angle to each other and each provided with a plurality of steps.

For the continuous alignment of the articles constituting the fine feed, the invention provides abutment tongues adjacent the aforementioned steps of the vibrating chutes, which are adjustable to a certain distance with regard to their associated steps and are arranged in the central axis thereof, and which also help to spread the batches of articles supplied to said vibrating chutes.

According to a further object of the invention the steps of the vibrating chute discharging directly into the scale hopper, are each provided with retaining means which at the moment at which the vibrating chute is stepped when the nominal weight has been reached, retains the articles situated on the corresponding step and dampens the end vibrations of the chute. Consequently, these retaining means which are conjointly controlled from the weighing machine, cause an immediate interruption of the flow of goods and prevent that after stopping of the vibrating chute further articles are fed to the outlet thereof which would cause pile-ups or gaps in the layer of goods situated on the vibrating chute.

The construction of the feed means according to the invention presents the advantage that the scale hopper is quickly filled with aligned articles of the aforementioned kind, and that furthermore a uniform fine feed is available for exact weighing-out so that a high efficiency of the machine and very accurate weights can be obtained.

The invention will now be described in more detail in connection with a preferred embodiment which is given by way of example only, and with reference to the accompanying drawings in which.

Figure 2:
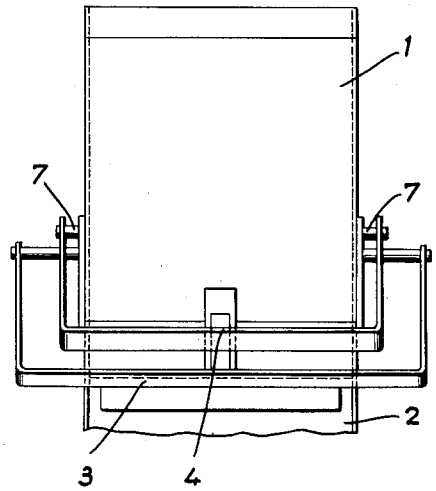
Fig. 2 is a front elevation of the portioning device provided on the feed hopper of the apparatus.

As shown in the drawings, the feed hopper 1 of the feeding apparatus is charged in known manner with spaghetti S which are the articles used in the embodiment illustrated. On the shaft-like outlet 2 of the hopper 1 is provided a portioning device. This comprises a preferably curved shut-off gate 3 and a separating wedge 4 which is arranged at a certain distance above the gate and the lower edge of which is preferably also of curved shape. The gate 3 as well as the separating wedge 4 are pivotably mounted on the outlet shaft 2, and are each alternately actuated by electromagnets 5 and 6, respectively, in such a manner that the gate 3 keeps the outlet shaft 2 closed until the separating wedge 4 has swung into it, and vice versa. When entering the outlet shaft, the separating wedge 4 divides off a certain volumetrically determined quantity of batch $S_t$ of the spaghetti S upstream of the gate 3, while at the same time lifting the spaghetti S situated above the wedge 4, which are thereby aligned in relation to each other. As shown in Fig. 2 the separating wedge 4 is arranged in the central plane of the shaft 2. Its width amounts to only a fraction of the width of the shaft so that spaghetti positioned obliquely in the latter cannot be broken when the wedge 4 is swung into the shaft. The size of the batch $S_t$ can be adjusted due to the fact that the mountings 7 of the separating wedge 4 and its associated electromagnet 6 are mounted on the hopper 1 in such a manner that their height is adjustable, for example by means of adjusting screws 37.

Provided in the outlet of the shaft 2 is a one or two-winged deflecting flap 8 which is actuated by an electromagnet 9. The flap 8 conducts the batches $S_t$ either into the vibrating chute 10 of a fine feed device generally designated 18, or into the uppermost hopper of a pre-filling or bulk filling device provided with a plurality of hoppers 11, 12, 13 which are arranged one below the other and have hinged side walls 31. The opening and closing of these hoppers 11 to 13 of which the lowermost discharges into the scale hopper 14, is effected by means of electromagnets 15, 16, 17 of which one is associated with each hopper.

The fine feed device 18 comprises two vibrating chutes 10, 19 arranged at an acute angle to each other and provided with steps. These chutes are actuated by electromagnets 35, 36, and the chute 19 discharges above the scale hopper 14.

Figure 3:
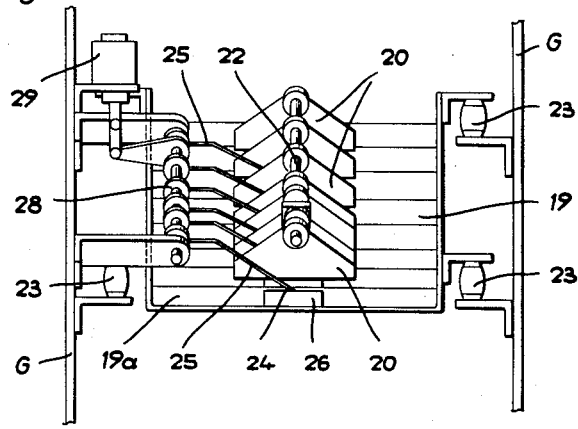
Fig. 3 is a partial plan view of the vibrating chute discharging into the hopper of the automatic scale.

The vibrating chutes 10, 19 are mounted on rubber mountings 23 and serve the purpose of spreading apart and thereby continuously aligning, the batches $S_t$ conducted from the portioning device 3, 4 over the flap 8 to the fine feed device 18, so that the spaghetti will drop in uniform sequence from the drop edge 19a of the lower chute 19 into the scale hopper 14. Abutment tongues 20 provided adjacent the steps of both vibrating chutes 10 and 19 prevent the spaghetti from falling in greater quantities over the individual steps, and from assuming an oblique position with regard to the chute. The tongues 20 of each chute are preferably mounted in an adjustable manner on common rails or rods 21, 22, respectively fixed on the machine frame G. As may be seen from Fig. 3 the width of the tongues 20 is substantially narrower than that of the chutes, and they are arranged in the central axis of the latter.

In order to prevent spaghetti from falling into the scale hopper 14 after the fine feed device 18 has been stopped, a retainer 24 is provided on the delivery end 19a of the lower vibrating chute 19, which retainer is actuated together with the switching-off of the electromagnet 36 in such a manner, that it retains the spaghetti which are still situated on the outlet portion 19a of the chute 19.

This retainer 24 comprises for example a rectangular foam rubber block 26 mounted on a lever 25 which through an intermediate shaft 28 is connected with an electromagnet 29.

In addition to this retainer 24 situated at the end of the lower vibrating chute 19, there are provided further similar retainers 30, for example five, which are also controlled through the intermediate shaft 28 and are arranged over the contiguous steps of this vibrating chute 19. The retainers 30 serve the purpose of preventing any further advance of the spaghetti after the chute 19 has been switched off, which might occur due to the end vibrations of the chute. Such further advance would have the result that on the one hand the spaghetti would pile up against the last retainer 24, and on the other hand gaps would develop in the flow of goods in the upper part of the chute 19, which would result in irregularities in the fine feed.

The arrangement of the retainers 24 and 30 has the further effect that the lower vibrating chute 19 must not be stopped completely when the nominal weight has been reached in the scale hopper 14, but must only be choked to reduce its amplitude of vibration. This results in an important advantage because in this way the irregular starting vibrations which are otherwise set up during restarting of the chute, and which have an adverse effect on the uniformity of the flow of goods, are avoided. This advantage is of particular importance when each individual article of the goods to be weighed constitutes a relatively large portion of the entire nominal weight.

The feeding apparatus according to the present invention is controlled by electric control means the arrangement and mode of operation of which is described in the following with reference to Figs. 4 and 5 of the drawings.

Let it be assumed that the hoppers 11 and 13 are each filled with a batch $S_t$ and that the scale hopper 14 is empty.

Figure 4:
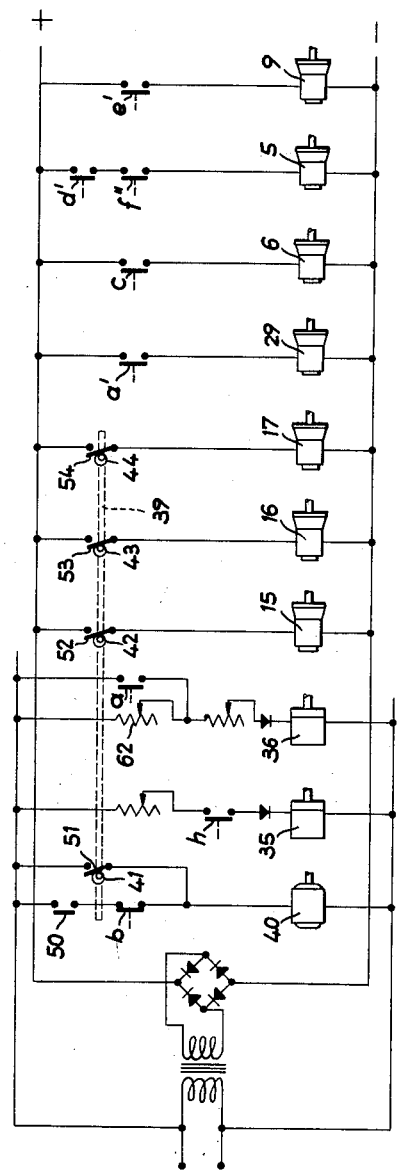
Figs. 4 and 5 show two wiring diagrams illustrating the control of the electrical means for operating the feeding apparatus.
Figure 5:
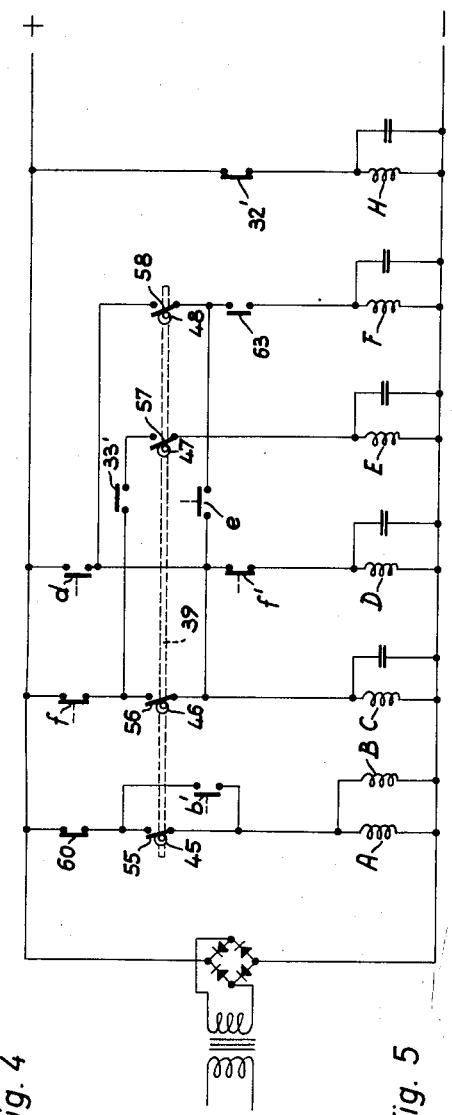

The feeding apparatus is put into operation by briefly closing a contact 50 (Fig. 4). This switches on a motor 40 which imparts one revolution to a camshaft 39. This single revolution is controlled by means of a contact 51 actuated by the cam 41 of shaft 39. At the beginning of the rotation of the camshaft 39 the cams 42, 43, and 44 thereof energize simultaneously the magnets 15, 17, and then the magnet 16, each for a short period of time, through the contacts 52, 53, 54, whereby the hoppers 11, 13, and 12 are opened during this short time interval. This has the effect that a batch $S_t$ drops from the lowermost hopper 13 into the scale hopper 14 as the new bulk filling, and at the same time a further batch $S_t$ falls from the hopper 11 into the middle hopper 12 which is empty at first and from where this batch $S_t$ is then immediately transferred to the lowermost hopper 13.

Hopper 11 receives its fresh filling via the deflecting flap 8 from the shaft 2. For this purpose, cam 46 (Fig. 5) of camshaft 39 closes at the beginning of the rotation of the latter a contact 56, whereby relays C and D are energized through rest contacts $f$ and $f'$. The relay C closes its contact $c$ (Fig. 4) so that the magnet 6 is switched on and swings the separating wedge 4 into the shaft 2 for dividing off a new batch $S_t$. Dropping of this batch $S_t$ is then effected by pulling out the gate 3. This movement is controlled on the one hand by the said relay D which closes its contacts $d$ and $d'$ with delayed action, and on the other hand by contact 58 which is situated in the same circuit and is closed by cam 48 (Fig. 5). In order to avoid that the gate 3 is pulled out before the separating wedge 4 has been completely swung in, a safety contact 63 is provided in the same circuit, which is closed when the separating wedge 4 is in its operative end position. Situated in the aforementioned circuit is a relay F (Fig. 5) the control contact $f''$ of which (Fig. 4) is situated in the circuit of the electromagnet 5 which actuates the gate 3. Simultaneously with the closing of control contact $f''$ the rest contacts $f$ and $f'$ (Fig. 5) which are also arranged on the relay F, are opened, thereby interrupting the circuit of the relays C and D. This has the effect that the gate 3 returns into the shaft 2 under the force of a spring which is built into the electromagnet 5, and immediately after this the separating wedge 4 moves out of the shaft 2, also under the influence of a spring.

Figure 1:
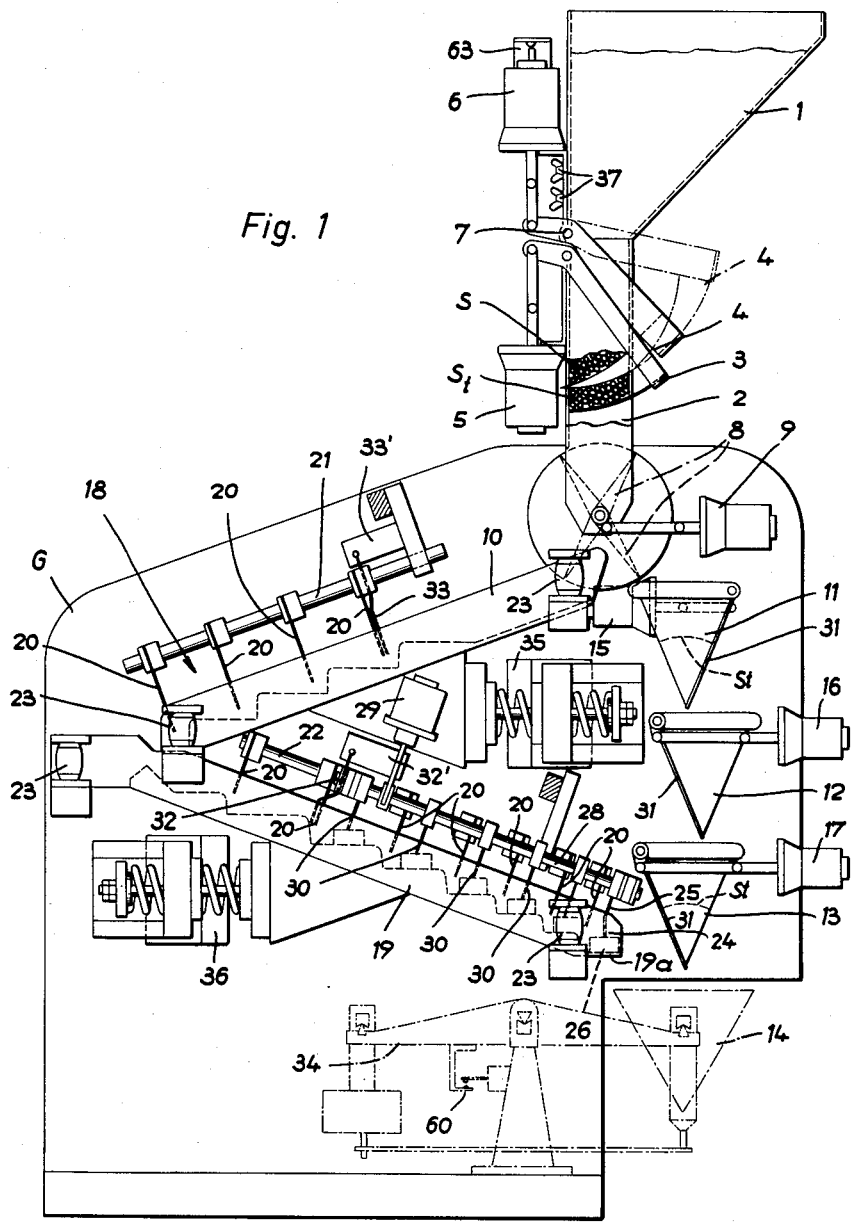
Fig. 1 is a side elevation of the entire feed apparatus according to the invention.

After the scale hopper 14 has received a batch $S_t$ in the manner described above, the weighing-out of the nominal quantity is effected. For this purpose two relays A and B (Fig. 5) are energized through the intermediary of a contact 55 controlled by cam 45, so that their contacts $a$, $a'$ and $b'$ close. The vibrating magnet 36 which is at first choked by a rheostat 62, is thereby fully switched in, and the retainers 26 and 30 are lifted off the steps of the vibrating chute 19 by the magnet 29, so that the goods are conveyed to the scale hopper 14 in the form of a fine feed. The relay B also opens simultaneously a contact $b$ in the circuit of the driving motor 40 of camshaft 39 whereby it is prevented that a new operating cycle is initiated by the contact 50 during the fine feed. When the nominal weight has been attained the beam 34 of the scale opens a contact 60 (Figs. 1 and 5) so that the two relays A and B become de-energized and open the contacts $a$, $a'$ and $b'$ whereby the vibrating magnet 36 is again choked and the retainers 26 and 30 descend on the steps of the lower vibrating chute 19. The opening of scale hopper 14 can then be effected as desired in a manner well known to the expert, either by automatic control or by means of an impulse sender, for example an impulse sender of a packaging machine on which the scale is mounted. The supply of goods to the vibrating chutes 10 and 19 is also effected through the portioning device 3, 4 and is controlled by a feeler 33 arranged above the vibrating chute 10 and having a contact 33', and by the cam 47 with associated contact 57. Since according to experience the filling of the upper hopper 11 requires less time than the weighing-out of the nominal quantity in the scale hopper 14, it is possible to convey intermediately a batch $S_t$ to the upper vibrating chute 10 after the filling of hopper 11. This is done by the cam 47 (Fig. 5) closing the contact 33' which is connected in series with contact 57, whereby the relay E is energized. By the closing of contacts $e$ and $e'$ which is thereby effected, the relays C and D are also energized and the magnet 9 is switched on, which latter pivots the deflecting flap 8 towards the vibrating chute 10 into the position shown in broken lines in Fig. 1. The relays C and D then operate as described above in order to divide off a fresh batch $S_t$ in the shaft 2 and convey this batch over the now pivoted deflecting flap 8 to the upper vibrating chute 10. However, this supply to the chute 10 is effected only if there is no longer a sufficient quantity of goods on said chute, so that the feeler contact 33' has been closed.

The switching on and off of the vibrating chute 10 is controlled by a feeler 32 which is connected with a contact 32'. The feeler 32 is arranged at the upper end of the lower vibrating chute 19 adjacent one of the tongues 20, and contacts the goods at this point. If the amount of goods is not sufficient on the chute 19, the feeler closes contact 32' whereby a relay H is energized. The relay H through its contact h switches on the vibrating magnet 35 of the upper vibrating chute 10 so that further goods are conveyed to the lower vibrating chute 19.

I claim:

1. Apparatus for delivering articles to provide a predetermined weight thereof, said apparatus comprising a supply hopper, a channel-like outlet connected to said hopper, a shut-off gate pivoted on said hopper and arranged to close said outlet at one pivoted position, a separating wedge pivoted on said hopper and arranged to close said outlet a predetermined distance above said gate at one pivoted position, the gate and the wedge together forming a portioning means within said outlet for delivering a predetermined quantity of said articles from said hopper, deflecting means pivoted in said outlet below said gate, a scale, a vibrating conveying means arranged below said deflecting means with its inlet end being communicable with said outlet and its discharge end being communicable with said scale, operating means for selectively pivoting said deflecting means to a first position whereby articles leaving said outlet are deflected to said scale, and to a second position whereby such articles are deflected to said conveyor means, means for vibrating said conveyor, and means controlled by said scale for stopping the conveyor vibrating means upon receipt of a predetermined weight of articles on said scale.

2. Apparatus according to claim 1, wherein a plurality of auxiliary hoppers of substantially triangular cross-section are arranged directly below one another and above said scale to receive articles from said outlet, said hoppers being provided with closing flaps, and operating means adapted to open and close said hoppers in sequence beginning with the lowermost hopper after the scale receptacle has been emptied.

3. An apparatus according to claim 1, wherein a movable retainer of relatively soft material is positioned at the discharge end of the vibratory conveyor discharging into said scale, and an electromagnet controlling said retainer and actuated by the vibrating conveyor so as to retain the articles situated in the discharge end of said conveyor.

4. An apparatus according to claim 1, in which the vibratory conveyor positioned directly adjacent said deflecting means is provided with a feeler adapted to contact the feed stream of articles on said conveyor and to pivot said deflecting means by means of an electromagnet when the height of the said feed stream drops below a predetermined level so that the articles will be deflected to the conveyor, and said deflecting means being adapted to actuate a contact for starting said portioning means after having reached said second position.

5. An apparatus according to claim 1, in which the mounting of the separating wedge and of the associated magnet is adjustably arranged as to height at said supply hopper.

6. An apparatus according to claim 2, wherein electromagnets are connected to actuate said closing flaps, sequentially operative switching means to control said electromagnets, said switching means comprising a cam-shaft and contacts actuated by said cam-shaft, said switching means being connected to be started by a contact provided on the beam of the scale, said switching means being further connected to start a corresponding operating cycle of said portioning means.

7. An apparatus according to claim 3, in which a plurality of movable retainers are arranged adjacent to the discharge end of the vibratory conveyor discharging into the scale, said retainers being adapted to be actuated simultaneously with the retainer at the discharge end of the conveyor and by the electromagnet of the latter retainer, and the energizing current of the said electromagnet being initiated by means of a contact actuated by the scale beam only when operation of the conveyor is off.

8. An apparatus according to claim 4, including means for switching said electromagnet actuating said deflecting means to block an energizing circuit of the electromagnet closed by said feeler during the interval in which the sequence control means of the auxiliary hoppers and of the portioning means is operative.

9. Apparatus for delivering articles to provide a quantity thereof having a predetermined weight, said apparatus comprising a scale for determining said quantity by weight, a supply hopper, portioning means disposed below said hopper for releasing a volumetrically predetermined quantity of said articles from said hopper, deflecting means disposed below said portioning means for selectively deflecting first and second portions of said volumetrically determined quantity in different directions, a first delivery means for delivering said first portion to said scale as a preliminary batch of weight slightly less than said predetermined weight, a second delivery means comprising a downwardly inclined vibratory chute communicable with said scale for receiving said second portion and delivering the articles therein in a uniform fine feed to said scale to provide said predetermined weight, control means operatively connected to said first and second delivery means for actuating said delivery means in sequence whereby said batch is first delivered to said scale, and means actuated by said scale for terminating operation of said second delivery means when said predetermined weight of said articles has been delivered to said scale.

10. Apparatus for delivering articles to provide a quantity thereof having a predetermined weight, said apparatus comprising a scale including a weight responsive control element actuated when said predetermined weight of said articles has been delivered to said scale, a supply hopper adapted to hold a supply of said articles, portioning means actuable to deliver a volumetrically predetermined batch of said articles from said hopper which batch is approximately equal to but slightly less than said quantity having said predetermined weight, first and second delivery means for receiving said batch from said portioning means, diverting means for diverting said batch selectively to said first or said second delivery means, said first delivery means being actuable along with said portioning means for receiving said batch from said diverting means and delivering said batch to said scale as a unit, said second means including downwardly inclined vibratory chute means for receiving said batch from said diverting means and delivering the articles included in said batch as a fine feed to said scale, sequentially operative control means for causing said batch to be delivered to said scale by said first delivery means before said vibratory chute is actuated to deliver said fine feed to said scale, sensing means acting on said diverting means to maintain a supply of said articles in said chute means, and terminating means actuated by said weight responsive control element for terminating said fine feed of said articles from said second delivery means to said scale.

11. Apparatus according to claim 10, wherein said vibratory chute means comprises serially arranged upstream and downstream chute members which are separately energizable and in which said apparatus further comprises sensing means responsive to the supply of articles on the downstream chute member for controlling vibration of the upstream chute member and means responsive to said terminating means for reducing the amplitude of vibration of said downstream chute member, said apparatus further comprising retaining means carried by said downstream chute member and operative during vibration of said downstream chute member at reduced amplitude for retaining said articles on said downstream chute member.

References Cited in the file of this patent

UNITED STATES PATENTS

| | | |
|---|---|---|
| 1,981,697 | Hartman | Nov. 20, 1934 |
| 1,982,127 | Venable | Nov. 27, 1934 |
| 1,986,268 | Hughes et al. | Jan. 1, 1935 |
| 2,098,324 | Ward et al. | Nov. 9, 1937 |
| 2,343,528 | Briggs | Mar. 7, 1944 |
| 2,345,287 | Peterson | Mar. 28, 1944 |
| 2,732,163 | Senzani | Jan. 24, 1956 |
| 2,904,304 | Zwoyer | Sept. 15, 1959 |

FOREIGN PATENTS

| | | |
|---|---|---|
| 728,782 | Great Britain | Apr. 27, 1955 |